US 8,659,976 B2

(12) United States Patent
Cotterill

(10) Patent No.: US 8,659,976 B2
(45) Date of Patent: Feb. 25, 2014

(54) ELECTRONIC BAFFLING OF SENSOR ARRAYS

(75) Inventor: Philip Andrew Cotterill, Stockport (GB)

(73) Assignee: Thales Holdings UK Plc, Nr Weybridge (GB)

( * ) Notice: Subject to any disclaimer, the term of this patent is extended or adjusted under 35 U.S.C. 154(b) by 294 days.

(21) Appl. No.: 12/849,464

(22) Filed: Aug. 3, 2010

(65) Prior Publication Data

US 2011/0085421 A1   Apr. 14, 2011

(30) Foreign Application Priority Data

Oct. 14, 2009 (GB) ................................. 0918011.8

(51) Int. Cl.
*G01S 3/80* (2006.01)
*G01S 3/801* (2006.01)

(52) U.S. Cl.
CPC ..................................... *G01S 3/801* (2013.01)
USPC .......................... 367/121; 367/118; 367/138

(58) Field of Classification Search
USPC ......................................... 367/118, 121, 138
See application file for complete search history.

(56) References Cited

U.S. PATENT DOCUMENTS

| | | |
|---|---|---|
| 3,873,958 A | 3/1975 | Whitehouse |
| 4,310,904 A | 1/1982 | Ballard et al. |
| 4,928,264 A | 5/1990 | Kahn |
| 5,220,537 A | 6/1993 | Sullivan |
| 5,420,825 A | 5/1995 | Fischer et al. |
| 5,504,716 A * | 4/1996 | Cotterill ........................ 367/121 |
| 5,774,417 A * | 6/1998 | Corrigan et al. ................ 367/24 |
| 5,930,201 A | 7/1999 | Cray |
| 6,552,964 B2 * | 4/2003 | Chiang et al. ................. 367/138 |
| 7,206,258 B1 | 4/2007 | Fisher et al. |
| 7,599,253 B1 | 10/2009 | Huang |
| 2003/0214880 A1 * | 11/2003 | Rowe ............................ 367/103 |
| 2003/0214881 A1 * | 11/2003 | Yang ............................. 367/134 |
| 2003/0225524 A1 * | 12/2003 | Iranpour ......................... 702/14 |
| 2007/0058488 A1 * | 3/2007 | Lerro et al. ..................... 367/99 |
| 2007/0269071 A1 * | 11/2007 | Hooley ......................... 381/336 |
| 2007/0294036 A1 * | 12/2007 | Strack et al. .................... 702/14 |

(Continued)

FOREIGN PATENT DOCUMENTS

| | | |
|---|---|---|
| GB | 2042725 A | 9/1980 |
| GB | 2 287 537 A | 9/1995 |
| GB | 2459704 A | 11/2009 |

OTHER PUBLICATIONS

Search Report issued Sep. 11, 2012 in European Application No. 10 25 1351.

(Continued)

*Primary Examiner* — Isam Alsomiri
*Assistant Examiner* — James Hulka
(74) *Attorney, Agent, or Firm* — Oblon, Spivak, McClelland, Maier & Neustadt, L.L.P.

(57) ABSTRACT

A method and system is described for reducing unwanted noise components/interfering targets detected through an ambiguous beam-steer direction, such as the ambiguous 'back-lobe' of a sensor array. A pressure sensor array 52 and a plurality of pressure gradient sub-arrays $54_{1-N}$ are beam-formed individually at processing stages 56, $58_{1-N}$ to derive signals indicative of directional responses, one from each group or sub-group. The signals are scaled and weighted (60, $62_{0-N}$) and processed to define a cardioid beam with nulls pointing in the ambiguous beam-steer direction.

27 Claims, 4 Drawing Sheets

(56) References Cited

U.S. PATENT DOCUMENTS

2008/0049551 A1* 2/2008 Muyzert et al. .................. 367/24
2008/0146940 A1* 6/2008 Jenkins et al. ................. 600/463
2008/0253596 A1* 10/2008 Klinkby et al. ............... 381/313
2009/0299661 A1* 12/2009 Green et al. .................... 702/54

OTHER PUBLICATIONS

British Search Report under Section 17 searched Feb. 12, 2010, in GB Patent Application No. GB0918011.8.

* cited by examiner

ELECTRONIC BAFFLING OF SENSOR ARRAYS

FIELD

The present invention relates to a method and system for reducing unwanted noise components/interfering targets detected through an ambiguous beam-steer direction and more particularly, but not exclusively, detected through the ambiguous 'back-lobe' of a sensor array.

BACKGROUND

One form of sensor array is a sonar array. Sonar arrays are often deployed on surface or sub-surface vessels to detect objects both on and below the surface. Typically the array comprises a group of pressure sensors, such as hydrophones, being fed along communication channels to be analysed by a sonar processing system on the vessel. The sensors are deployed in various locations about the vessel, to facilitate all round cover, or they may be towed in a line behind the vessel. The data from the sensors are processed to form directional outputs, each of which is sensitive to acoustic signals coming from a particular direction, hereafter referred to as directional beams.

Sensor arrays that are mounted upon the vessel, such as its flanks or bow, are hereinafter referred to as hull-arrays. Such arrays are usually planar, or may be curved but with a radius of curvature that is large compared with an acoustic wavelength. In free-field conditions, the directional response of such arrays is ambiguous, that is they possess a back-lobe at the same orientation to the plane of the array as the main (front) lobe; they give little or no attenuation to noise/interfering targets that lie in the back-lobes of their directional beams. Interfering targets from behind the array are of little concern to arrays mounted directly on the hull because, except at very low frequencies, the vessel to which they are attached acts as a highly effective baffle. However hull-arrays are subject to unwanted noise sources arising from vibrations transmitted through the hull of the vessel, and whilst much of this noise is attenuated via the side-lobe response of the array, noise components lying in the back-lobe have the same directional characteristics as the wanted signal and cannot be rejected via conventional signal processing methods.

The traditional approach to reducing the vibration noise detected via the back-lobe of a hull array is to insert a baffle between the array and the hull in order to isolate mechanically, as far as possible, the sensors from the hull vibrations. Mechanical baffling is extremely effective at higher frequencies but at low frequencies the decoupling performance decreases and becomes ineffective unless the baffle is made very thick. However thick baffles add considerable weight (and cost) to the vessel, which can affect the vessel's performance. On submarines, the baffle's compressibility can give rise to undesirable variations in buoyancy with depth changes, particularly for large arrays.

SUMMARY

Embodiments described herein generally relate to an arrangement which provides in one of its applications a method and system for reducing noise detected via the back-lobe of the array without incurring the disadvantages of mechanical baffling (described above) as employed in traditional arrays. One of the many possible applications is to minimise or eliminate, the noise components arising from the hull of a vessel.

According to a first embodiment there is provided a method of reducing unwanted noise components detected through an ambiguous beam-steering direction associated with a sensor array, comprising deriving signals from two groups of sensors within the sensor array, beamforming each group of sensors individually to produce two sets of directional responses, one from each group, with the same steer angle, and combining pairs of beams with corresponding steer directions, one beam for each group per steer direction, to form cardioid beams with nulls pointing in the ambiguous steer direction.

In one embodiment the method comprises combining the outputs of hydrophones that sense pressure with those from pressure-gradient sensors, deployed within the same array, that measure the pressure gradient normal to the plane of the array. Whilst hydrophones and pressure-gradient sensors cannot individually discriminate between noise components lying within the ambiguous beam-steering direction, such as the back lobe of the array, and signal components lying within the front-lobe, when their outputs are combined they are able to do so.

Thus in one embodiment, the array of sensors comprises a first group of pressure sensors (hydrophones) and a second group of pressure gradient sensors, the acoustic centres of the two groups of sensors being ideally collocated although some mis-alignment is tolerable. The method comprises deriving the signals from each group of sensors, and beamforming each group individually to produce two sets of directional responses (one from each group) with the same maximum response (steer) angles. Pairs of beams with corresponding steer directions (one beam from each group per steer direction) are then combined (after appropriate scaling and phase-shifting to account for any misalignment of acoustic centres) to form cardioid beams with nulls pointing in the ambiguous beam-steer directions, i.e. the back lobe is removed.

In another embodiment the sensors are combined adaptively to form a plurality of nulls whose positions are optimised in real-time to maximise noise rejection.

In a further embodiment the first and second group of sensors are both composed of hydrophones with one group mounted a small distance from the other in a direction normal to the array so as to form a dual layer of sensors. The summed output of each pair of normally separated sensors provides the 'hydrophone' response, whilst their difference gives the 'pressure-gradient'. The sensors are then processed as per embodiments comprising different types of sensor to measure pressure and pressure-gradient.

In one embodiment there are equal numbers of hydrophones and pressure-gradient sensors and individual pairs of sensors are acoustically collocated, or they may be offset from one other. In another embodiment one pressure-gradient sensor may be associated with one, two, three, four or more hydrophones as a means of reducing the cost of the array given the relatively high cost of pressure-gradient sensors.

When the array is processed adaptively another embodiment is to split each group of sensors into sub-groups, each sub-group comprising either, one or more hydrophones or, one or more pressure-gradient sensors. Each sub-group is independently beamformed to a set of common steer-directions. Beams from sub-groups with corresponding steers directions are then combined adaptively to form a plurality of nulls whose positions are optimised in real-time to maximise noise rejection.

According to another embodiment there is provided a sensor system comprising an array of sensors comprising two groups of sensors, means for deriving signals from the two groups of sensors, a beamformer for beamforming each group of sensors individually to produce a respective set of directional responses, one from each group, with the same steer angle, a signal and data processor for combining pairs of beams with corresponding steer directions, one beam for each group per steer direction, to form cardioid beams with nulls pointing in the ambiguous steer direction.

According to one embodiment the sensor array is an array of acoustic sensors, the output signals from the sensors being electronically connected directly or indirectly to the beamformer, the output signals from which are electronically connected directly or indirectly to the signal and data processor, the signal and data processor being adapted to derive from the signals received from the beamformer, data for combining the signals from the groups of sensors to generate one or more nulls pointing in a direction towards the source of noise. The source of noise may be from the hull of a vessel or from interfering acoustic sources.

In a further embodiment there is provided a sensor array, the array comprising a first group of sensors and a second group of sensors, each group of sensors being arranged and operable for implementing the method according to the invention as defined in the accompanying claims.

In one embodiment of the array both groups of sensors are pressure sensors disposed as a dual layer the planes of which are conveniently spaced apart and parallel to one another. In a further embodiment of the array one group of sensors comprises pressure sensors and the other group of sensors comprises pressure gradient sensors. The two groups of sensors may be acoustically co-located within the array.

In another embodiment of the array one or more pressure gradient sensors are acoustically co-located with a plurality of pressure sensors which together form a group or a sub-group of sensors within the array. The sub-group of sensors may also define sub-arrays within the array.

The sensors employed for use in an array may act as receivers for passive or active sonars dependent on the operational requirements of the system.

Another embodiment comprises a computer program product operable, when executed on a computer, to cause the computer to perform the methods as defined above. The product may itself be implemented on a storage medium, such as a magnetic or optical disc, or a memory device, or a hardware implementation such as an ASIC or the like.

The computer program product may also be in the form of a signal carrying computer receivable information, the information defining computer executable instructions which, when executed on a general purpose computer controlled sensor system, causes the system to become configured to perform the method of the invention defined above.

BRIEF DESCRIPTION OF THE DRAWINGS

Embodiments will be described further by way of specific examples with reference to the accompanying drawings in which.

DETAILED DESCRIPTION

In the following description, specific implementations are described. It will be appreciated by the reader these are provided by way of example only, and are not intended to provide a restriction or limitation on the scope of the invention, which is defined in the appended claims.

Figure 1:
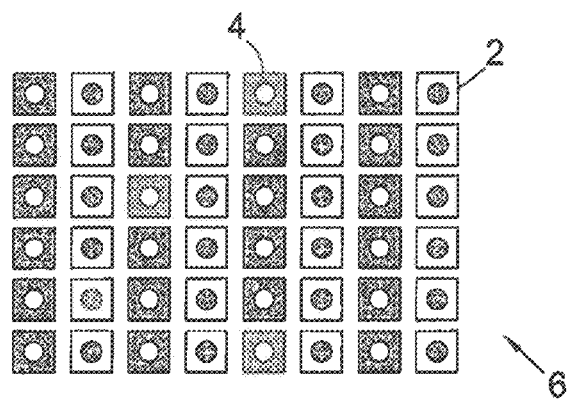
FIG. 1 is a schematic diagram of a sonar array according to a first embodiment.

Referring to FIG. 1 a sensor array 6 according to a first embodiment comprises a plurality of acoustic sensors 2, 4 configured as alternate columns of pressure sensors 4 and pressure gradient sensors 2, although many other configurations can be adopted dependant on cost and operational requirements.

Figure 2:
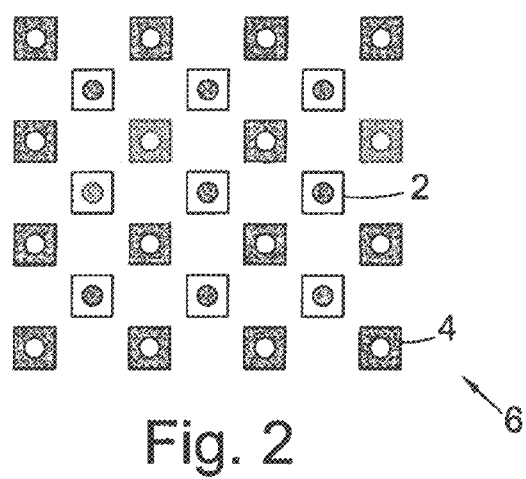
FIG. 2 is a schematic diagram of a sonar array according to a second embodiment.

With reference to FIG. 2, a sensor array according to a second embodiment comprises a plurality of acoustic sensors as shown in FIG. 1 but with a different configuration. As in the embodiment of FIG. 1 the different types of sensors 2, 4 are arranged in alternate columns however the number of pressure gradient sensors 2 are reduced.

In FIGS. 1 and 2 the two types of acoustic sensors 2, 4 are shown located in the same plane, although some misalignment is permissible.

Figure 6:
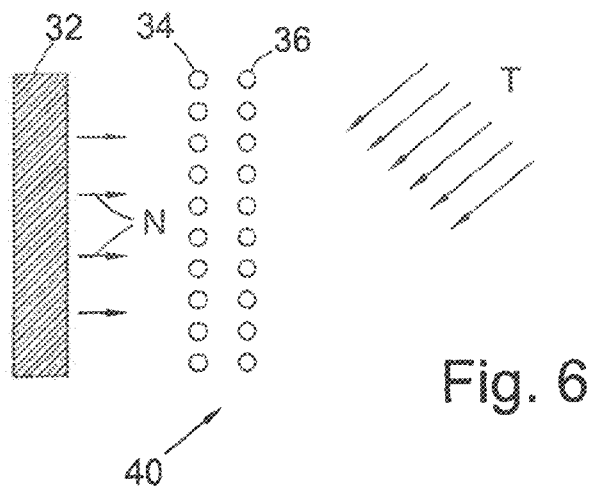
FIGS. 6 and 7 are schematic diagrams illustrating dual-layer array configurations according to different embodiments.

In another embodiment a dual-layer array of hydrophone sensors is employed, in which the two layers of hydrophones are spaced apart by a small distance normal to the array. This is illustrated in FIG. 6.

Referring again to FIGS. 1 and 2, in which the sensor arrays comprise two types of acoustic sensors 2, 4, the number of each type of acoustic sensor 2, 4 can be chosen to meet both cost and operational requirements. For example, if the number of pressure sensors 4 is designated by $N_p$ and the number of pressure gradient sensors 2 is designated by $N_a$ the ratio of $N_p:N_a$ is desirably more than unity to reduce costs. However the ratio can vary widely dependent on application such that the ratio may be less than, equal to or greater than one.

In the various embodiments each of the two types of sensors 2, 4 are coupled to a beamformer, described later, where they are independently beamformed. If the array comprises a dual-layer of pressure sensors 4 then each layer may also be independently beamformed.

The configurations shown in FIGS. 1 and 2 are shown by way of example only to illustrate just two of the numerous different configurations in which the different types of the sensors 2, 4 can be arranged. In addition as previously mentioned it is possible to have a sensor array comprising solely of pressure sensors 4 if those pressure sensors are arranged as a multi-layered array, that is arranged in two or more planes.

Figure 3:
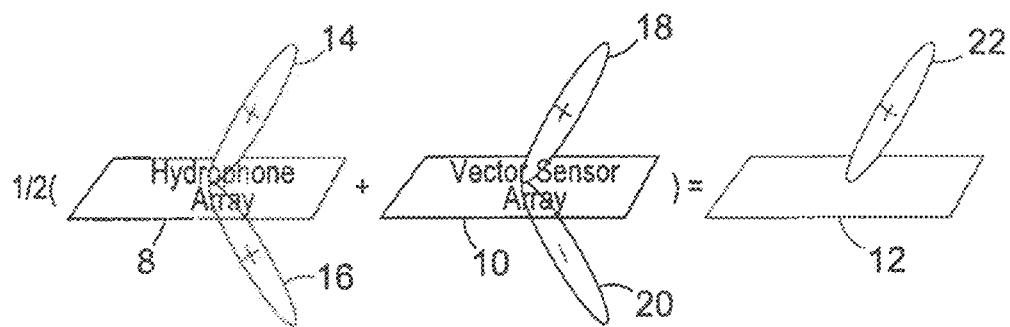
FIG. 3 is a schematic diagram of a cardioid processing method in accordance with an embodiment.

A simplified illustration of cardioid processing is shown in FIG. 3, which shows a single directional response (beam) for: a hydrophone array 8, a pressure gradient array 10, and an array 12 that combines the responses of the other two—sometimes referred to as a cardioid array. Individual hydrophones in array 8 have a directional pattern that is essentially omni-directional (monopole) and they produce beams 14, 16 whose front and back-lobes have the same magnitude and phase. By contrast the directional pattern of pressure-gradient sensors in array 10 is essentially dipole in nature (with maximum response normal to the array) and they produce beams 18, 20 whose front and back-lobes have the same magnitude but opposite phase. Thus when the two beam systems are combined (after appropriate scaling) their front-lobes 22 add whilst their back-lobes cancel leading to a significant reduction in the noise field detected via the back-lobe of the array.

The pressure-gradient can be determined by any sensor that responds to the variation in pressure across it rather than directly to the pressure itself. Such devices include: displacement sensors, velocity sensors and accelerometers.

The required pressure gradient can also be determined in another embodiment of the invention by subtracting the outputs from two hydrophones that are separated by a small distance normal to the array as illustrated in FIG. 6.

Analysing the cardioid processing method of FIG. 3 in more detail, the sets of conventional beams are formed so as to cover the angles of interest using the pressure sensors (hydrophones) and the pressure gradient sensors separately. Ignoring for a moment the effect of the baffle, such beams are ambiguous having an equal (or slightly attenuated, in the case of an array with curvature) component at the complementary angle (the so-called back-lobe) on the other side of the array. The essential property of pressure gradient sensors is that their dipole response to a signal should vary as the cosine of the angle of arrival relative to the axis of the sensor (locally normal to the plane of the array). Thus a given signal from a sound source in a particular beam would change sign if the sound source were placed in the ambiguous beam on the other side of the array. Thus the amplitude and phase of the pressure sensor (hydrophone) and/or pressure gradient beams are scaled to make their sensitivities to a signal equal then the co-directional beams are added together, the signals in the beams on one side of the array reinforce each other, while those on the other side of the array cancel out. Thus the cardioid beams should be insensitive to acoustic energy arriving from the rear of the array.

Figure 4:
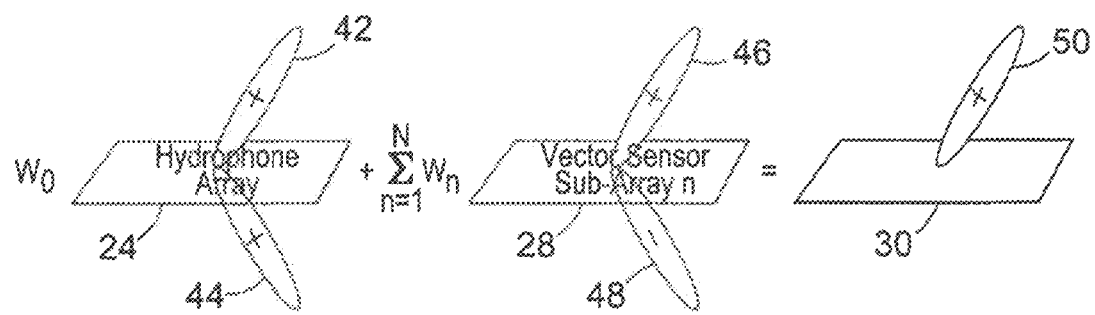
FIG. 4 is a schematic diagram of an Electronic Baffle processing method in accordance with an embodiment.

The Electronic Baffle processing as illustrated in the schematic diagram of FIG. 4 relies on the same resealing and phase correction of pressure sensor (hydrophone) and pressure gradient beams, but, in this case a pressure gradient array 26 is divided into a number, N, of sub-arrays. As with the cardioid processing sets of conventional beams are formed covering the angles of interest using the pressure sensors (hydrophones) in a hydrophone array 24. Sets of beams 46, 48, co-directional with the hydrophone beams 42, 44, are formed on each pressure gradient sub-array. Adaptive weights $W_{0-n}$ are calculated and are used to sum the sets of co-directional beams as illustrated in FIG. 4. The adaptive weights $W_{0-n}$ are chosen to minimise the energy but are subject to the constraint of unity gain in the steer direction. One embodiment of a processing chain is shown in FIG. 5.

Figure 5:
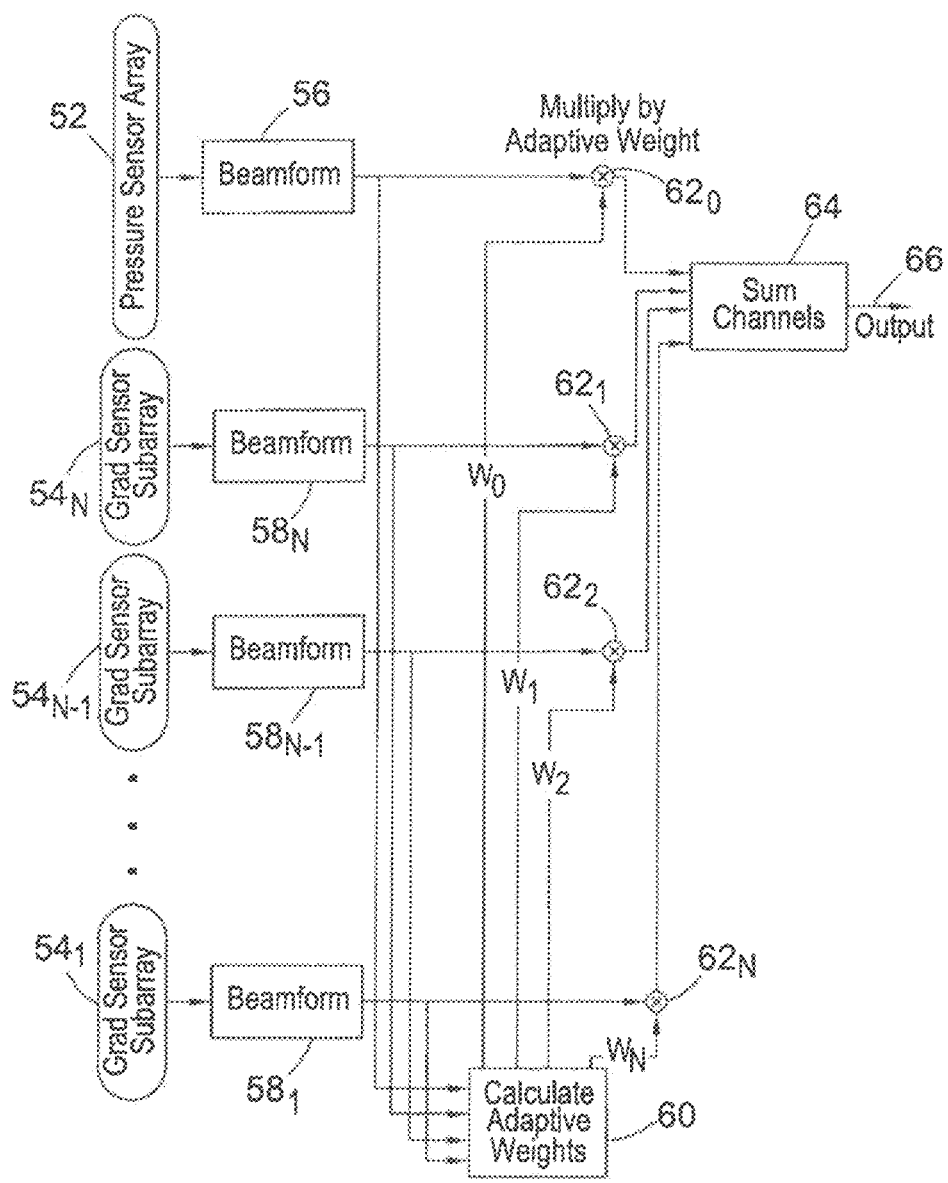
FIG. 5 is a schematic diagram of a processing chain employed in the Electronic Baffle processing method of FIG. 4.

Referring to the processing chain illustrated in FIG. 5, there is illustrated a pressure sensor array 52 and a plurality of pressure-gradient sub-arrays $54_{1-N}$. The pressure sensor array 52 and each of the pressure-gradient sub-arrays $54_{1-N}$ are beamformed individually as schematically illustrated at processing stages 56, $58_1 \ldots 58_{N-1}$, $58_N$ to derive signals indicative of the directional responses, one from each group or sub-group. The scaling and weighting for each of these signals is calculated at a processing step 60. The derived adaptive weights $W_0$, $W_1$, $W_2 \ldots W_N$ are then multiplied with the derived signals at multipliers $62_0$, $62_1$, $62_2 \ldots 62_N$ and the products obtained added together at a processing step 64 to derive an output signal which is used to define an adaptive beam with nulls pointing in the directions of interfering noise sources. The null directions may include, but are not limited to, the ambiguous beam directions of conventional arrays.

Another embodiment further constrains the set of adaptive weights to enforce a null in the back-lobe direction in order to attenuate the reflection in the baffle of the (desired) signal. This avoids a potentially destructive interference between the direct path signal and its reflection in the baffle.

In the embodiment utilising twin layers of pressure sensors, sums and differences of the signals on complementary hydrophones in the two layers are formed. These summed and differenced channels have similar properties to those pertaining to pressure sensors (hydrophones) and pressure gradient sensors and are processed in the same way. Alternatively, groups of sensors from within each layer may be combined to form fans of conventional beams, with corresponding beams from each such group then combined adaptively.

Figure 7:
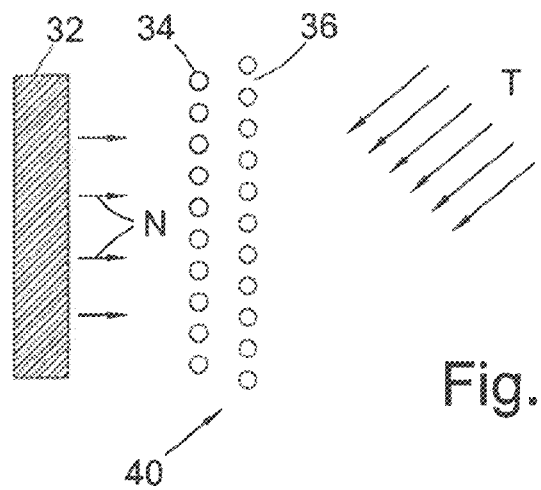
Figure 8:
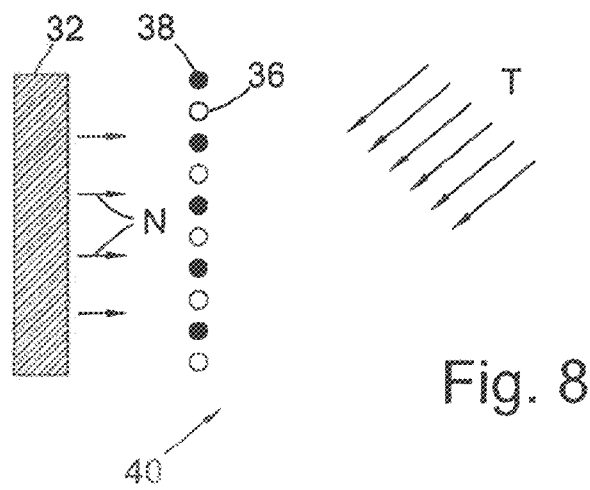
FIG. 8 is a schematic diagram illustrating a single-layer array configuration according to an embodiment.

FIGS. 6 to 8 show various configurations for arrays 40. The arrays 40 are shown spaced from a source of noise 32, which may for example be the hull of a vessel, such as ships, subsurface vessels. The source of noise N is shown arriving at the arrays 40 from one side, whilst a desired target signal T is shown arriving from the opposite side of the array 40.

FIGS. 6 and 7 illustrate dual-layer arrays in which separate layers of pressure sensors (hydrophones) 34, 36 are provided. The different characteristics between the incoming and outgoing acoustic fields arriving at each layer of hydrophones enabling a discrimination to be made between the noise N and target signals T. In FIG. 6 the hydrophones 34, 36 are shown in line with one another whereas in FIG. 7 they are offset.

FIG. 8 illustrates a single-layer array in which the pressure-gradient sensors 38 are interspersed evenly amongst the pressure sensors 36. In this illustration the hydrophones and pressure-gradient sensors are shown in the same plane. This is the optimum configuration although if practical considerations required it some offset between the two planes of sensors can be tolerated.

It will be appreciated that other configurations of sensors may be adopted dependent on application and cost requirements.

The sensors may be combined with either fixed weights to form a cardioid with an inward-pointing null or adaptively to form several nulls whose positions are optimised in real-time to maximise noise rejection, for example hull-noise rejection.

It will also be appreciated that other configurations of the array are possible within the scope of the invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods, products and systems described herein may be made without departing from the spirit of the inventions. The accompanying claims and their equivalents are intended to cover such forms or modifications as would fall within the scope and spirit of the inventions.

The invention claimed is:

1. A method of reducing unwanted noise components detected by a sensor array, comprising:
   deriving signals from two groups of sensors within the sensor array,
   beam forming the first group of sensors to produce a first set of directional response beams, each directional response beam in the first set having a respective steer direction,
   beam forming the second group of sensors to produce a second set of directional response beams, each directional response beam in the second set having a same steer direction as a respective directional response beam in the first set, each one of the directional response beams having respective front and back lobes that extend on opposite sides of the array, and the front and back lobes of the directional response beams in the first set having a same phase as one another and the front and back lobes of the directional response beams in the second set having an opposite phase to one another, and combining pairs of directional response beams having the same steer directions, one beam from each group per steer direction, to form cardioid beams with nulls pointing in at least one beam-steering direction.

2. The method according to claim 1, wherein the beams from each group of sensors with corresponding steer directions are combined adaptively to form a plurality of nulls whose positions are optimised in real-time to maximise noise rejection.

3. The method according to claim 1, wherein the first and second group of sensors are acoustically co-located within the array.

4. The method according to claim 1, wherein the first and second group of sensors together define a dual layer of sensors.

5. The method as claimed in claim 1, wherein both the first and second group of sensors comprise pressure sensors.

6. The method according to claim 5, wherein each group of pressure sensors is located in its own respective plane.

7. The method according to claim 1, wherein the first and second group of sensors comprise pressure sensors and pressure gradient sensors.

8. The method as claimed in claim 7, wherein one group comprises pressure sensors and the other group comprises pressure gradient sensors.

9. The method as claimed in claim 8, wherein the pressure gradient sensors are selected from one or more of a group consisting of a vector sensor, velocity sensor, accelerometer and displacement sensor.

10. The method as claimed in claim 1, wherein one or both groups of sensors define sub-groups of sensors.

11. The method as claimed in claim 10, wherein one pressure gradient sensor is associated with one or more pressure sensors defining each group dependent upon the specific operation and cost constraints requirements for the array.

12. A non-transitory computer program product operable, when executed on a computer, to cause the computer to perform a method as defined in claim 1.

13. The non-transitory computer program product as claimed in claim 12 wherein the product is implemented as a storage medium.

14. The non-transitory computer program product as claimed in claim 13 wherein the storage medium comprises one or more from a group consisting of a magnetic or optical disc, a memory device, and a hardware implementation in the form of an application specific integrated circuit (ASIC).

15. A sensor system comprising:
an array of sensors comprising two groups of sensors,
means for deriving signals from the two groups of sensors,
a beamformer for beamforming the first group of sensors to produce a first set of directional response beams and for beamforming the second group of sensors to produce a second set of directional response beams, each directional response beam in the first set having a respective steer direction and each directional response beam in the second set having a same steer direction as a respective directional response beam in the first set, each one of the directional response beams having respective front and back lobes that extend on opposite sides of the array, and the front and back lobes of the directional response beams in the first set having a same phase as one another and the front and back lobes of the directional response beams in the second set having an opposite phase to one another, a signal and data processor for combining pairs of directional response beams having the same steer directions, one beam from each group per steer direction, to form cardioid beams with nulls pointing in at least one beam-steering direction.

16. The system according to claim 15, wherein said signal and data processor is operable to adaptively combine the beams from each group of sensors with corresponding steer directions to form a plurality of nulls whose directions are optimised in real-time to maximise noise rejection.

17. The system according to claim 15, wherein the first and second group of sensors are acoustically co-located within the array.

18. The system according to claim 15, wherein the first and second group of sensors together define a dual layer of sensors.

19. The system as claimed in claim 15, wherein both the first and second group of sensors comprise pressure sensors.

20. The system according to claim 19, wherein each group of pressure sensors is located in its own respective plane.

21. The system according to claim 19, comprising beamforming the signals from the groups of sensors.

22. The system according to claim 21, wherein the beamformed signals are adaptively combined to generate one or more nulls pointing in a direction towards a source of noise.

23. The system according to claim 15, wherein the first and second group of sensors comprise pressure sensors and pressure gradient sensors.

24. The system as claimed in claim 23, wherein one group comprises pressure sensors and the other group comprises pressure gradient sensors.

25. The system as claimed in claim 24, wherein the pressure gradient sensors are selected from one or more of a group consisting of a vector sensor, velocity sensor, accelerometer and displacement sensor.

26. The system as claimed in claim 24, wherein one or both groups of sensors define sub-groups of sensors.

27. The system as claimed in claim 26, wherein one pressure gradient sensor is associated with one, two, three or four or more pressure sensors defining each group dependent upon the specific operation and cost constraints requirements for the array.

* * * * *